United States Patent Office 3,548,022
Patented Dec. 15, 1970

---

3,548,022
PROCESS FOR PREPARING HEXADIENES
Masao Iwamoto, 354-1 Kamibeppo-cho, Zezo, Ohtsu-shi, Japan, and Sadao Yuguchi, 4-25 2-chome, Beppo, Ohtsu-shi, Japan
No Drawing. Filed Apr. 18, 1966, Ser. No. 543,075
Claims priority, application Japan, Apr. 22, 1965, 40/23,434; Sept. 4, 1965, 40/53,860; Nov. 19, 1965, 40/70,809
Int. Cl. C07c 3/10, 11/12
U.S. Cl. 260—680        17 Claims

ABSTRACT OF THE DISCLOSURE

Process for preparing hexadienes which comprises reacting an alpha-olefin with a conjugated diolefinic hydrocarbon in the presence of catalyst composed of (a) a diphosphine-cobalt hydride complex and (b)(i) an organoaluminum compound, (ii) an alcohol or a phenol, or (iii) a Friedel-Craft catalyst.

---

This invention relates to a process for preparing hexadienes. More particularly, the invention relates to a process for producing hexadienes in good yield by reacting alpha-olefins with conjugated diolefinic hydrocarbons in the presence of a new catalyst composition comprising a complex compound of cobalt hydride and a tertiary diphosphine.

The hexadienes are compounds having various uses as intermediates. Recently, 1,4-hexadienes have been attracting attention particularly as a third component for imparting sulfur vulcanizability to an ethylene-propylene copolymer, the so-called ethylene-propylene rubber.

It has been known to prepare 1,4-hexadienes by reacting ethylene with 1,3-butadiene in the presence of prescribed catalysts. For example, U.S. Pat. 3,152,195 discloses a process wherein is used rhodium chloride as catalyst. On the other hand, French patent specification 1,388,305 discloses a process wherein a combination of a nickel-phosphorus complex and an organometallic compound is used as catalyst.

However, the rhodium chloride which is used as catalyst in the former process is very costly. Hence the production cost inevitably rises when this compound is used. On the other hand, in the latter process the selectivity for the intended hexadienes is not satisfactory.

An object of the present invention is to provide a process differing from these prior art processes in that the hexadienes are produced from alpha-olefins and conjugated diolefinic hydrocarbons in good yield and moreover with a simple operation by using a novel catalyst system.

Another object of the invention is to provide a process for obtaining the desired hexadienes with high selectivity by the choice of the catalytic components and a selection of the conjugated diolefins.

Namely, the present invention is directed to a process for producing hexadienes which comprises reacting an alpha-olefin with a conjugated diolefinic hydrocarbon in the presence of a catalytic amount of a composition consisting of two components of:
(1) A cobalt compound of the formula $$CoH[R_2P(R')_nPR_2]_m$$

wherein R is a member selected from alkyl and aryl groups, R' is a member selected from alkylene, alkenyl-ene and arylene groups, $n$ is 0 or 1, and $m$ is 1 or 2; and
(2) A compound selected from the group consisting of
(a) an organoaluminum compound of the formula $$R^2{}_lAlX_{3-l}$$

wherein $R^2$ is a monovalent hydrocarbon group, X is a member selected from hydrogen and halogen groups, and $l$ is a number from 1 to 3;
(b) an organic compound of the formula $$R^3OH$$

wherein $R^3$ is a member selected from alkyl, cycloalkyl, aryl and substituted aryl groups; and
(c) a Friedel-Craft catalyst A complex compound of cobalt hydride and a tertiary disphosphine used in this invention as a first component of a catalytic composition is represented by the formula $$CoH[R_2P(R')_nPR_2]_m$$

When a ligand represented by $R_2P(R')_nPR_2$ in said formula is exemplified; 1,1-bis(diphenylphosphino) methane, 1,2-bis(diphenylphosphino) ethane, 1,2-bis(diethylphosphino) ethane, 1,2-bis(diphenylphosphino) ethylene, 1,3 - bis(diphenylphosphino) propane, 1,4 - bis(diphenylphosphino) butane, 1,2-bis(diphenylphosphino) benzene, tetramethyl biphosphine and tetraethyl biphosphine may be cited.

In general, when $n$ is 1 in the foregoing formula, R is preferably a phenyl group, while R' is preferably an alkylene group of 1-4 carbon atoms, or phenylene group. Of these, particularly to be preferred is the instance when R is a phenyl group and R' is a trimethylene or dimethylene group. On the other hand, when $n$ is 0, it is preferred that the aforesaid R is an alkyl group of 1-4 carbon atoms.

And $n$ representing the coordination number of a tertiary diphosphine is 1 or 2, however, that $n$ is 2 is preferable from the viewpoint of activity of a catalytic composition to be obtained.

Thus, when representative cobalt compounds usable in this invention are exemplified, the following may be cited.

$$CoH[Ph_2PCH_2CH_2PPh_2]_2$$
$$CoH[Ph_2PCH_2CH_2CH_2PPh_2]_2$$
$$CoH[Ph_2PCH_2CH_2PPh_2]$$
$$CoH[(C_2H_5)_2PCH_2CH_2P(C_2H_5)_2]_2$$
$$CoH[Ph_2PCH=CHPPh_2]_2$$
$$CoH[Ph_2PC_6H_4PPh_2]_2$$

wherein Ph denotes a phenyl group.
Of these compounds, in particular $$CoH[Ph_2PCH_2CH_2PPh_2]_2 \text{ and}$$
$$CoH[Ph_2PCH_2CH_2CH_2PPh_2]_2$$

are preferable.

These compounds may be generally prepared in accordance with a process of A. Sacco and R. Ugo [Journal of Chemical Society, 3274 (1964) London].

This invention includes not only the case of using a complex compound of cobalt hydride and a tertiary diphosphine prepared in advance, but also the case of producing said compound in a reaction system. For instance, it is possible to add in combination a cobalt complex of $CoCl_2[R_2P(R')_nPR_2]_2$ with $LiAlH_4$ or $NaBH_4$ to a reaction system and making them $CoH[R_2P(R')_nPR_2]_m$ in the reaction system. In this case mixing molar ratio of the cobalt compound and the complex metal hydride of about 1–5 is proper.

These complex compounds are complexes similar to $HCo(Co)_4$. For instance, $CoH[Ph_2PCH_2CH_2PPh_2]_2$ is a reddish brown crystal, slightly unstable in air, but dissolves in water or alcohol without decomposing. When perchloric acid is worked on this complex compound, it converts to a stable salt, therefore, it can be stored in the form of said salt. It is possible to restore said salt by working caustic soda thereon to the original hydride upon using.

A compound used as a second component of a catalytic composition is an organoaluminium compound, a compound of the formula $R^3OH$ wherein $R^3$ is a member selected from alkyl, cycloalkyl, aryl and substituted aryl groups of a Friedel-Craft catalyst.

On the other hand, the aforesaid organoaluminium compounds of the formula $R^2_1AlX_{3-1}$, the second component of the catalyst, are preferably those in which R is an alkyl group, and particularly a lower alkyl group, examples of these compounds include trialkylaluminiums such as triethylaluminium, tri-n-propylaluminium, tri-iso-propylaluminium and tri-isobutylaluminium; dialkylaluminium monohalides such as diethylaluminium monochloride, diethylaluminium monobromide, diethylaluminium monoiodide, diisobutylaluminium monochloride and diisobutylaluminium monobromide; alkylaluminium dihalides such as ethyl aluminium dichloride, ethylaluminium dibromide, isobutylaluminium dichloride, isobutylaluminium dibromide and isobutylaluminium diiodide; alkylaluminium sesquihalides such as ethylaluminium sesquichloride, ethylaluminium sesquibromide, isobutylaluminium sesquibromide and hexylaluminium sesquichloride; and alkylaluminium hydrides such as diethylaluminium hydride and diisobutylaluminium hydride. These compounds can be used alone or as a mixture.

When the aforesaid organoaluminium compound is used as a second component of a catalytic composition, the most suitable molar ratio of the two components varies depending upon the combination of the compounds used, however, it is preferable that the molar ratio of the organoaluminium compound to the aforesaid cobalt complex is not less than 1, especially 5–100.

And with reference to another compound used as a second component of a catalytic composition, $R^3OH$, it is preferable that $R^3$ is a lower alkyl group, phenyl group, and a phenyl group substituted by a lower alkyl group, another hydroxyl and a halogen. When the representative preferable compounds are exemplified, there may be cited methylalcohol, ethylalcohol, phenol, p- and o-chlorophenol, p-bromophenol, cresol, 3,5-dimethyl phenol, 2,4-dichlorophenol and 2,4,5-trichlorophenol. Of these, phenols having electron-absorbing substituents such as halogen are especially preferable.

In the catalytic composition of this invention when the compound of the formula $R^3OH$ is used as a second component, it is generally preferable to use 10–200 mols of the compound of $R^3OH$ per 1 mol of the aforesaid cobalt hydride complex.

A further compound used as a second component of the catalyst is a Friedel-Crafts catalyst. Of the compounds belonging to this Friedel-Crafts catalyst, use of $AlCl_3$, $SnCl_4$, $ZrCl_4$, $WCl_6$, $BF_3(OEt_2)$ $TiCl_4$ and $Al_2Br_6$ is preferable. The ratio of these Friedel-Crafts catalyst to the cobalt complex compound is preferably 0.1–5.0 mol of the Friedel-Craft catalyst per 1 mol of the cobalt compound.

In the present invention, alpha-olefins are reacted with conjugated diolefinic hydrocarbons in the presence of a catalytic amount of the foregoing two-component catalyst. In the catalytic composition of the present invention, it is possible to increase its activity by adding hydrogen into the system. For instance, when alcohols or phenols are used as a second component of the catalyst, it is preferable to do so.

The alpha-olefins, which are used in the present invention as the starting material, are those hydrocarbons of the formula $R-CH=CH_2$, where R is hydrogen or an alkyl group of 1–8 carbon atoms. Included, for example, are ethylene, propylene, butene-1, pentene-1, hexene-1 and heptene-1, particularly preferred being ethylene and propylene.

The conjugated diolefinic hydrocarbons, which are used in this invention as the other starting material, are either 1,3-butadiene or alkyl or aryl-substituted 1,3-butadienes. Of these compounds, those suitably used in the invention process are 1,3-butadiene and 2-alkyl-1,3-butadienes, 4-alkyl-1,3-butadiene, 2,3-dialkyl-1,3-butadienes, 1,4-dialkyl-1,3-butadiene and 2,4-dialkyl-1,3-butadiene (the alkyl groups herein indicated are those of 1–20 carbon atoms, and preferably 1–6 carbon atoms). Thus, as typical compounds can be mentioned 1,3-butadiene, isoprene, 2-ethyl-1,3-butadiene, 1,3-hexadiene, 1,3-pentadiene, 2,4-hexadiene, 2,3-dimethyl-1,3-butadiene, 2,3-diethyl-1,3-butadiene and 2-methyl-1,3-pentadiene. Moreover, as aryl-substituted-1,3-butadiene, 2-phenyl-1,3-butadiene may be used. Generally, the use of 1,3-butadiene and isoprene are to be preferred.

The alpha-olefins and the conjungated diolefinic hydrocarbons are reacted stoichiometrically of course, but it is not necessarily required that these reactants are present in the reaction system in equivalent quantities. For example, the reaction may be made to proceed merely introducing the alpha-olefin into the reaction system, in the case where the total amount of the conjugated diolefinic hydrocarbon has been added to the system in advance.

The amount of the catalyst used relatively of these starting materials will vary depending upon the particular catalyst system used but generally speaking, it is usually preferred that the cobalt complex be present in an amount of $10^{-5}$ to $10^{-1}$ mols, and particularly $10^{-4}$ to $10^{-2}$ mols to every 1 mol of the conjugated diolefinic hydrocarbon.

In those instances where the conjugated diolefinic hydrocarbon is liquefied in the reaction system, the use of a solvent may be dispensed with. However, for minimizing as much as possible the occurrence of a reaction between the conjugated diolefinic hydrocarbon and enhancing the amount formed of the intended hexadienes, preferred is the use of a suitable solvent, consideration being given to the dispersibility and solubility of the catalyst.

Conveniently usable as such solvents are the hydrocarbons such as pentane, heptane, cyclohexane, benzene, toluene and xylene and the halogenated hydrocarbons such as chlorobenzene, bromobenzene, methylene, chloride, 1,2-dichloroethane and 1,3-dichloropropane. Further, if a substance which is gaseous at room temperature such as propane and butane is used as the solvent, the separation of the solvent by means of distillation is made much more easy.

According to the invention process, there are no particular restrictions as to the reaction temperature and pressure as well as the other reaction conditions, variation of these conditions over a broad range being possible.

Now, if mention is made of the convenient ranges for these conditions, a reaction temperature ranging between 20° and 250° C. is convenient, a range between 50° and 150° C. being especially desirable. On the other hand, the reaction pressure may be either normal atmospheric or superatmospheric. In general, a pressure of 5–300 kg. per square centimeters is conveniently used depending upon the alpha-olefin used.

Thus the desired hexadienes can be synthesized by the invention process by suitably varying the conditions within the ranges indicated hereinabove of the present invention. For example, when ethylene is used as the alpha-olefin, the relationship between the class of the conjugated diolefinic hydrocarbon used and the mainly resulting hexadienes are, in general, as follows.

(1) 1,3-butadiene→1,4-hexadiene
(2) 2-alkyl-1,3-butadiene→5-alkyl - 1,4 - hexadiene, 4-alkyl-1,4-hexadiene
(3) 4-alkyl-1,3 - butadiene→3 - alkyl-1,4 - hexadiene, 6-alkyl-1,4-hexadiene
(4) 2,3-dialkyl - 1,3-butadiene→4,5 - dialkyl - 1,4-hexadiene On the other hand, when propylene is used as the alpha-olefin, the hexadiene obtained is as follows.

butadiene→2-methyl-1,4-hexadiene

Further, as the conjugate diolefinic hydrocarbon it is also possible to use, for example, the hexadiene-2,4- obtained by isomerization of hexadiene-1,4. Thus, according to this invention, such hexadienes can also be reached further with ethylene.

The critical feature of the present invention is the use of a catalytic composition containing a specified cobalt hydride complex, namely, a diphosphine-cobalt hydride complex. In consequence of the use of such a catalyst system, the formation of by-products as a result of the dimerization or polymerization of the conjugated diolefinic hydrocarbon is extremely small, and the yield (selectivity) of hexadiene per diolefin reacted attains as much as 85 to 97%. Thus the selectivity for the intended hexadiene also becomes very high. For example, when preparing hexadiene-1,4 from butadiene-1,3, the selectivity for hexadiene-1,4 becomes as high as 85–95%, a value markedly superior to less than 70% that was generally attained by the conventional methods.

Further, in a preferable mode wherein alcohols or phenols are used as a second component of the catalyst, the handling of the catalyst is very easy.

According to the present invention, it is possible to provide, as hereinbefore described, a broad range of hexadienes on a commercial scale, using a low-cost catalyst. The so obtained hexadienes, for example, hexadiene-1,4, are useful without further treatment as monomers for polymerization or copolymerization in the plastic, rubber, textile and adhesive fields. In addition, they are also important as intermediates of those valuable compounds having two functional groups. For a clear understanding of the present invention, the following examples are given. Unless otherwise indicated, the percentages are on a weight basis.

EXAMPLE 1

In this example, $CoH[(C_6H_5)_2PCH_2CH_2P(C_6H_5)_2]_2$ obtained by the process of A. Sacco, R. Ugo [Journal of Chemical Society, 3274 (1964)] (hereinafter referred to as $CoH(DPE)_2$) was used.

An autoclave of an internal capacity of 200 cc. was charged with 20 cc. of toluene wherein 0.5 mmol of $CoH(DPE)_2$ was dissolved. Said autoclave was further charged with 110 cc. of butadiene obtained by liquefaction and 1 cc. of $(C_2H_5)_3Al$, thereafter it was sealed and ethylene was pressed thereinto. The reaction was carried out at a reaction temperature of 80–98° C. and a pressure of 35 kg./cm.² (gauge) maintained by ethylene for 3 hours.

The distillate of the reaction product was analyzed by a gas chromatography and it was confirmed that the following products were obtained.

|  | G. |
|---|---|
| 1,4-hexadiene | 51.2 |
| 2,4-hexadiene | 0.6 |
| Butadiene dimer | 2.7 |
| High boilers | 3.6 |

EXAMPLE 2

In this example, an explanation will be made about a process for using $CoH(DPE)_2$ as an additional salt of perchloric acid.

When perchloric acid was worked on the $CoH(DPE)_2$ complex, a yellow stable complex was obtained.

By carrying out the reaction same as in Example 1 except using said complex, using 20 cc. of monochlorobenzene as solvent and keeping a pressure of 28 kg./cm.² by ethylene, 41 g. of 1,4-hexadiene were obtained.

The amount of the by-product butadiene and what had a high boiling point was 2.3 g.

EXAMPLE 3

By carrying out the reaction same as in Example 1 except using monochlorobenzene as solvent and $(C_2H_5)_2AlCl$ as organoaluminium compound, 57 g. of 1,4-hexadiene, 20.2 g. of 2,4-hexadiene and 18.6 g. of $C_8$ non-conjugated diene produced by the addition of ethylene to 2,4-hexadiene were obtained.

EXAMPLE 4

A rotary stirring autoclave was charged with 0.42 g. of $CoH(DPE)_2$ dissolved in 30 cc. of $C_2H_5OH$ and 30 cc. of butadiene liquefied in advance and the autoclave was sealed. Making hydrogen pressure 20 kg./cm.², the autoclave was heated, when the temperature reached 100° C. the internal pressure was 25 kg./cm². Next, ethylene was pressed thereinto whereby the internal pressure was made 60 kg./cm². While the temperature was kept as it was, the reaction was carried out for 17 hours. After completion of the reaction, the residual gas was released and a certain amount of toluene was added as a reference and a gas chromatograph was measured and it was confirmed that 10.4 g. of 1,4-hexadiene were produced. Said hexadiene was all cis form. By distillation of the reaction mixture 3.5 g. of a residue were obtained. The conversion of the charged butadiene was 55%.

EXAMPLE 5

By carrying out the reaction same as in Example 4 except adding 38 cc. of liquefied butadiene and the reaction was carried out at 92–98° C. for 21 hours, the following products were obtained.

|  | G. |
|---|---|
| 1,4-hexadiene | 18.4 |
| 2,4-hexadiene | 0.15 |
| Cyclohexane | 0.07 |
| Vinyl cyclohexane | 0.28 |
| High boilers | 3.7 |

The conversion of the charged butadiene was 71.3%.

EXAMPLE 6

By carrying out the reaction same as in Example 4 except pressing ethylene only into the autoclave without adding $H_2$ into the autoclave and the reaction was carried out at 94–96° C. for 17.5 hours. 11.3 g. of 1,4-hexadiene were obtained. Other residues were 0.5 g. and the selective yield of 1,4-hexadiene was 95.8%. The conversion of the charged butadiene was 24.5%, being low as compared with the conversion ratio of 71.3% in the system added with hydrogen in Example 5.

EXAMPLE 7

In this example, an explanation will be made about a case wherein $CoH(DPE)_2$ is formed in the reaction system without adding $CoH(DPE)_2$ produced in advance.

To 30 cc. of $C_2H_5OH$ were added 0.4 g. of $CoCl_2[Ph_2PCH_2CH_2CH_2PPh_2]_2$ (hereinafter may be referred to as $CoCl_2(DPE)_2$), 0.114 g. of $LiAlH_4$ and 50 cc. of liquefied butadiene, and the autoclave was sealed. The reaction was carried out at 96–100° C. under an initial ethylene pressure of 60 kg./cm.² for 21 hours. As a result of similar analysis, it was recognized that 13.5 g. of 1,4-hexadiene were produced. The conversion of the charged butadiene was 37.4%.

EXAMPLE 8

The reaction same as in Example 7 except that the reaction system was pressed to 20 kg./cm.$^2$ by hydrogen, thereafter applying a pressure by ethylene and the reaction was carried out at 95–100° C. for 20 hours was carried out.

clave, this reaction system was applied with a pressure by ethylene and the reaction was carried out with stirring at a predetermined temperature for a pre-determined period.

The results of analysis by a gas chromatography of the products were shown as follows.

| Ex. | Solvent | Liquified butadiene (cc.) | LiAlH$_4$ (g.) | Pressure by ethylene (kg./cm.$^2$) | Temp., °C. | Period, hr. | Product (g.) 1,4-HD | 2,4-HD | C$_8$ | Others | Residue |
|---|---|---|---|---|---|---|---|---|---|---|---|
| 17 | None | 60 | 1 | 60 | 92–100 | 16.5 | 24.2 | 0.7 | 0.2 | 0.2 | 6.2 |
| 18 | do | 62 | 0.114 | 60 | 90–110 | 18 | 58.7 | 1.7 | 0.3 | 0.3 | 6.8 |
| 19 | Used | 55 | 0.057 | 50 | 82–90 | 17 | 54.3 | 0.3 | | | 5.4 |
| 20 | None | 60 | 0.20 | 60 | 105–110 | 18 | 66.9 | 0.8 | | 0.3 | 5.8 |

The highest pressure was 60 kg./cm.$^2$. 22.6 g. of 1,4-hexadiene were produced. The conversion of the charged butadiene was 65.3%.

By comparison of Example 7 and this example it became apparent that addition of H$_2$ is effective and preferable for the increase of activity.

EXAMPLE 9

The experiment same as in Example 4 except using 30 cc. of phenol instead of ethyl alcohol and applying a pressure by ethylene only without adding H$_2$ and the reaction was carried out at 96–100° C. for 18 hours, was carried out. The highest pressure of the reaction system was 60 kg./cm.$^2$ and the pressure when the reaction was completed was 25 kg./cm.$^2$. As a result, 21.5 g. of 1,4-hexadiene were obtained. The conversion of the changed butadiene was 51.3%.

EXAMPLES 10–12

A rotary stirring autoclave of an internal capacity of 200 cc. was charged with 50 cc. of toluene, 50 cc. of liquefied butadiene and 0.5 mmol (0.42 g.) of $$\text{CoH(DPE)}_2$$

and the amounts set forth below of para-chlorophenol and the autoclave was sealed. This reaction system was applied with a pressure of 45 kg./cm.$^2$ and the reaction was carried out with stirring for 17–17.5 hours. The results were shown in the following table.

| Example | Para-chlorophenol added (mmol) | Molar ratio of p-chlorophenol to Co hydride | 1,4-hexadiene (g.) |
|---|---|---|---|
| 10 | 1 | 2 | 2.4 |
| 11 | 5 | 10 | 6.5 |
| 12 | 50 | 100 | 48.6 |

EXAMPLES 13–15

The reaction same as in Example 12 except using the phenols shown in the following table was carried out, and the following results were obtained.

| Example | Phenols added | Produced amount of 1,4-hexadiene (g.) | Butadiene conversion (percent) |
|---|---|---|---|
| 13 | Ortho-chlorophenol | 22.1 | 51.3 |
| 14 | Para-cresol | 7.2 | 18 |
| 15 | 3,5-dimethylphenol | 17 | 40.6 |

EXAMPLE 16

By carrying out the reaction same as in Example 12 except that 0.4 g. of CoCl(DPE)$_2$ and 0.114 g. of lithium aluminium hydride were added to form a cobalt hydride complex in the reaction system, 46.3 g. of 1,4-hexadiene were obtained with the conversion of the charged butadiene being 94.2%.

EXAMPLES 17–21

A rotary stirring autoclave of an internal capacity of 200 cc. was charged with 50 cc. of toluene, 6.45 g. of para-chlorophenol, 0.4 g. of a cobalt (II) chloride-bis (diphenylphosphino) ethane complex, liquefied butadiene and lithium aluminium hydride, after sealing the autowherein HD stands for hexadiene, C$_8$ stands for a non-conjugated diene having 8 carbon atoms obtained by adding one molecule of ethylene to hexadiene, residue is a residue remained when the reaction mixture washed with water was distilled under atmospheric pressure (at a bath temperature of 150° C.) and the majority thereof was parachlorophenol.

EXAMPLES 21–22

An experiment was carried out by using a cobalt complex in an amount smaller than that in Example 17. CoCl(DPE)$_2$ and LiAlH$_4$ in the amounts described in the following table were added without using a solvent under a pressure of 60 kg./cm.$^2$ caused by ethylene, and the reaction was carried out at 100° C. for 18 hours. The results shown in the following table were obtained.

| Ex. | CoCl$_2$(DPE)$_2$ (g.) | LiAlH$_4$ (g.) | Liquified butadiene (cc.) | Product (g.) 1,4 HD | 2,4 HD | Other | Residue |
|---|---|---|---|---|---|---|---|
| 21 | 0.1 | 0.04 | 150 | 102.9 | 1.1 | 2.2 | 8.4 |
| 22 | 0.08 | 0.016 | 100 | 57.7 | 0.8 | 3.4 | 6.3 |

From the above table, it would be understood that 1030 g. of 1,4-HD were obtained per 1 g. of the cobalt complex.

EXAMPLE 23

A complex of 1,3-bis(diphenylphosphino) propane obtained by the reaction similar to that which gave bis(diphenylphosphino)ethane and anhydrous cobalt chloride has the following composition.

$$\text{CoCl}_2(\text{Ph}_2\text{PCH}_2\text{CH}_2\text{CH}_2\text{PPh}_2)_2$$

An autoclave having an internal capacity of 200 cc. was charged with 6.4 g. of para-chlorophenol, 0.08 g. of said cobalt complex, 100 cc. of liquefied butadiene and 0.016 g. of LiAlH$_4$, a pressure of 60 kg./cm.$^2$ was applied by ethylene and the reaction was carried out at 92–110° C. with stirring for 18.5 hours. That a greater part of the reaction was completed in the initial 2 hours was understood from the pressure of an ethylene gas.

By the analysis of the product, it was found that 91.3 g. of 1,4-hexadiene, 0.33 g. of 2,4-hexadiene, 0.9 g. of other products and 6.7 g. of residual distillate were obtained. The selective yield of 1,4-hexadiene was 98.5%, and the yield of 1,4-hexadiene per 1 g. of the cobalt complex was 1140 g.

EXAMPLE 24

An autoclave of a capacity of 200 cc. was charged with 6.4 g. of para-chlorophenol, 0.4 g. of $$\text{CoCl}_2[(\text{C}_6\text{H}_5)_2\text{PCH}_2\text{CH}_2\text{P}(\text{C}_6\text{H}_5)_2]_2$$

34 ml. of liquefied butadiene, 56 ml. of liquefied propylene and 0.114 g. of LiAlH$_4$ and the autoclave was sealed. The reaction was carried out at 100° C. under an autogenous pressure for 18 hours and 45 minutes, and 16.9 g. of 2-methyl-1,4-hexadiene, a 1:1 addition product of butadiene-propylene were produced.

EXAMPLE 25

0.08 g. of CoCl$_2$[(C$_6$H$_5$)$_2$PCH$_2$CH$_2$P(C$_6$H$_5$)$_2$]$_2$ was mixed with 0.032 g. of NaBH$_4$ in 6.4 g. of para-chlorophenol, to which mixture were added 100 ml. of butadiene, and the reaction was carried out at 100° C. under a pressure of 60 kg./cm.² applied by ethylene for 18.5 hours. As a result, 60.7 g. of 1,4-hexadiene were obtained.

EXAMPLE 26

The reaction same as in Example 12 was carried out except 50 ml. of isoprene were used instead of liquefied butadiene as a conjugated diene. As a result, 38.1 g. of methyl-1,4-hexadiene were obtained, 77% of which was 4-methyl-1,4-hexadiene and the rest was 5-methyl-1,4 hexadiene.

EXAMPLE 27

An autoclave was charged with 50 ml. of toluene, 0.42 g. of $CoH(DPE)_2$, 55 ml. of liquefied butadiene and 9.87 g. of 2,4,5-trichlorophenol and the autoclave was sealed. The content was applied with and kept under a pressure of 60 kg./cm.² by ethylene and reacted at 85–95° C. From the mixture obtained by distillation after 5 hours, 57.2 g. of 1,4-hexadiene and 0.9 g. of 2,4-hexadiene were separated.

EXAMPLE 28

An autoclave was charged with 0.42 g. of $CoH(DPE)_2$ dissolved in 30 ml. of phenol, and 50 ml. of isoprene and the autoclave was sealed. The content was applied with and kept under a pressure of 60 kg./cm.² by ethylene and the reaction was carried out at 90–95° C. for 18 hours. As a result, 37.6 g. of 1:1 isoprene-ethylene addition product of methyl-1,4-hexadiene (the ratio of 4-methyl isomer was 80.6% and the rest was 5-methyl isomer) were obtained.

EXAMPLE 29

An autoclave cooled in a Dry Ice-action bath was charged with 6.4 g. of para-chlorophenol, 34 ml. of liquefied butadiene and 56 ml. of liquefied propylene, next 0.4 g. of $CoH(DPE)_2$ and 0.114 g. of $LiAlH_4$ and the autoclave was sealed. The reaction was carried out at 92–100° C. under an autogeneous pressure with stirring for 18 hours and 45 minutes. As a result, 16.9 g. of a 1:1 addition product of butadiene and propylene of 2-methyl-1,4-hexadiene were obtained.

EXAMPLES 30–34

An autoclave was charged with the phenols shown in the following table, 0.4 g. of $CoH(DPE)_2$, 50 ml. of toluene and 50 ml. of liquefied butadiene and a pressure of 60 kg./cm.² was applied thereto by ethylene, and while keeping said pressure and a temperature of 100° C. the content was reacted for 17 hours. The results as shown in the following table were obtained.

| Example | Phenols | Amounts used (g.) | 1,4-hexadiene (g.) |
| --- | --- | --- | --- |
| 30 | 2,4-dichlorophenol | 7.65 | 54.8 |
| 31 | Resorcinol | 5.5 | 24.2 |
| 32 | Hydroquinone | 5.5 | 7.4 |
| 33 | Resorcinol | 5.5 | 43.2 |
| 34 | Hydroquinone | 5.5 | 13.3 |

NOTE: In Examples 33 and 34, 20 ml. of ethanol was added.

EXAMPLE 35

An electromagnetic inductive rotary stirring autoclave having a capacity of 200 cc. was charged with 20 ml. of toluene, 0.5 mmol of $CoH(DPE)_2$, 60 ml. of liquefied butadiene and 2 mmol $Et_{1.5}AlCl_{1.5}$ and the autoclave was sealed. When the reaction was carried out at 90° C. under a pressure of 40 kg./cm.² applied by ethylene for 30 minutes, the conversion of the charged butadiene was 93.4% and 1,4-hexadiene was obtained at the selective yield of 95.5%. The yield of 1,4-hexadiene was 51.2 g.

EXAMPLE 36

By carrying out the reaction same as in Example 35 except using 7.3 mmol of iso-$Bu_3Al$ instead of $Et_{1.5}AlCl_{1.5}$ and carrying out the reaction for 1 hour, 54.1 g. of 1,4-hexadiene were obtained. The selective yield of 1,4-hexadiene in the product was 96.1%.

EXAMPLE 37

By carrying out the reaction same as in Example 35 except using $EtAlCl_2$ whose molar ratio to $CoH(DPE)_2$ being 5 as an organoaluminium compound and carrying out the reaction for 1.5 hours, 53.2 g. of 1,4-hexadiene were obtained at a selective yield of 84.8%.

EXAMPLE 38

An autoclave same as that of Example 35 was charged with 20 ml. of monochlorobenzene, 0.42 g. of $CoH(DPE)_2$, 0.7 ml. of $Et_3Al$ (Al/Co molar ratio being 10) and 68 ml. of liquefied butadiene, a pressure of 40 kg./cm.₂ was applied thereto by ethylene which pressure was kept and the reaction was carried out at 90° C. for 2 hours. As a result, 55.6 g. of 1,4-hexadiene were obtained. The conversion yield of butadiene was 91.3% while the selective ratio of 1,4-hexadiene was 93%.

When the reaction was carried out under the same condition with 20 ml. of toluene used as a solvent, the obtained 1,4-hexadiene was 21.8 g. and the conversion of the charged butadiene was 40.6%.

EXAMPLE 39

An autoclave same as that of Example 35 was charged, in sequence, with 20 ml. of toluene, 0.2 g. of $CoH(DPE)_2$, 60 ml. of liquefied butadiene and 3 ml. of a xylene solution of $Et_2AlCl$ (including 1.9 mmol of $Et_2AlCl$). The content was applied with a pressure by ethylene, and the reaction was carried out at 130° C. under a pressure of 40 kg./cm.₂ for 1 hour. The remarkable absorption of ethylene was completed within 30 minutes. 57.5 g. of 1,4-hexadiene were produced.

EXAMPLES 40–44

By carrying out the reaction same as in Example 39 except using 20 ml. of the solvents as shown in the following table, the following results were obtained.

| Example | Solvent | Yield of 1,4-hexadiene (g.) | Butadiene conversion (percent) |
| --- | --- | --- | --- |
| 40 | Monochlorobenzene | 47.6 | 84.6 |
| 41 | Cyclohexane | 37.8 | 70.5 |
| 42 | Ethyl acetate | 8.9 | 16.2 |
| 43 | Tetrahydrofuran | 2.4 | 5.1 |
| 44 | Ethyl ether | 13.9 | 27.1 |

EXAMPLE 45

An autoclave was charged with 100 ml. of isoprene, 0.16 g. of $CoH(DPE)_2$ and 0.75 ml. of $Et_2AlCl$ without using a solvent and the autoclave was sealed. A pressure was applied thereto by ethylene, and the reaction was carried out at 90–100° C. under a pressure of 40 kg./cm.² for 30 minutes. As a result, 88 g. of methyl-1,4-hexadiene were obtained with a selectivity of 95.8%. 96.3% of the isoprene was converted.

EXAMPLE 46

An autoclave was charged with 20 ml. of monochlorobenzene as a solvent, 40 ml. of liquefied butadiene, 60 ml. of liquefied propylene, 0.212 g. of $CoH(DPE)_2$ and 1 mil, of $Et_2AlCl$ and sealed, and the content was reacted at 100° C. under an autogenous pressure for 2 hours. As a result of adding butadiene to propylene at a ratio of 1:1, there was obtained 27 g. of 2-methyl-1,4-hexadiene. In addition, small amounts of n-heptadiene and 2-methyl-1,3-hexadiene were produced as by-products.

EXAMPLE 47

Using an aluminum component obtained by reacting $Et_3Al$ and an equimolar amount of water as a catalyst component, an autoclave was charged with 20 ml. of an organoaluminum compound (containing 7.3 mmol of Al) solution reacted in toluene as mentioned above, 0.42 g.

of CoH(DPE)₂ and 60 ml. of liquefied butadiene, and a pressure of 40 kg./cm.² was applied thereto by ethylene, and the reaction was carried out at 90° C. under said pressure for 2 hours. As a result, 11 g. of 1,4-hexadiene were obtained. The selective yield of 1,4-hexadiene produced was 91.5%.

EXAMPLE 48

The resulting product by a reaction of $Et_3Al$ with $AlCl_3$ was used as a component of a catalyst. To 40 ml. of toluene were added 9.73 mmol of $Et_3Al$ and 4.86 mmol of $AlCl_3$. The mixture was stirred to make it a homogeneous solution, 20 ml. of which were taken out and subjected to a reaction and charged in an autoclave.

Said autoclave was charged with 0.42 g. of CoH(DPE)₂ and 60 ml. of liquefied butadiene, a pressure of 40 kg./cm.² was applied thereto by ethylene and the reaction was carried out at 90° C. under said pressure for 2 hours. 61.6 g. of 1,4-hexadiene were obtained at a selective ratio of 94.8%. The activity was increased over the case when $Et_3Al$ was used alone.

EXAMPLE 49

In this example, an explanation will be made about a case wherein aluminum chloride is used as a second component of a catalyst.

An autoclave having an internal capacity of 200 cc. was charged with 0.42 g. of CoH(DPE)₂, 7.5 mmol of aluminum chloride and 60 ml. of liquefied butadiene, a pressure of 40 kg./cm.² was applied thereto by ethylene and the reaction was carried out at 100–110° C. under said pressure for 2 hours. As a result, 14.7 g. of hexadiene were produced, at the same time 21.6 g. of polymer were obtained as by-product.

EXAMPLES 50–53

In these examples, an explanation will be made that various Friedel-Crafts catalyst are usable.

By carrying out the reaction same as in Example 49 except the following halides were used instead of aluminum chloride, 1,4-hexadiene was obtained.

| Example | Friedel-Crafts catalyst | Mmol | 1,4-hexadiene (g.) |
|---|---|---|---|
| 50 | SnCl₄ | 7.5 | 3.6 |
| 51 | ZrCl₄ | 7.5 | 3.3 |
| 52 | WCl₆ | 0.25 | 1.3 |
| 53 | BF₃(OEt₂) | 10.6 | 2.3 |

We claim:
1. A process for producing hexadienes which comprises reacting an alpha-olefin of the formula R—CH=CH₂ wherein R is selected from the group consisting of hydrogen and alkyls of 1 to 8 carbon atoms with a conjugated diolefinic hydrocarbon in the presence of a catalytic amount of a composition consisting of two components of:
 (1) a cobalt compound of the formula

$$CoH[R_2P(R')_nPR_2]_m$$

wherein R is a member selected from alkyl and aryl groups, R' is a member selected from alkylene, alkenylene and arylene groups, n is 0 or 1, and m is 1 or 2; and
 (2) a compound selected from the group consisting of
  (a) an organoaluminum compound of the formula $$R^2_lAlX_{3-l}$$

where R² is a monovalent hydrocarbon group, X is a member selected from hydrogen and halogen groups, and l is a number from 1 to 3;
  (b) an organic compound of the formula $$R^3OH$$

wherein R³ is a member selected from alkyl, cycloalkyl, aryl and substituted aryl groups; and
  (c) a Friedel-Crafts catalyst.

2. A process as described in claim 1 wherein said cobalt compound is CoH[(C₆H₅)₂PCH₂CH₂P(C₆H₅)₂]₂.
3. A process as described in claim 1 wherein said cobalt compound is CoH[(C₆H₅)₂PCH₂CH₂CH₂P(C₆H₅)₂]₂

4. A process as described in claim 1 wherein said alpha-olefin is ethylene.
5. A process as described in claim 1 wherein said alpha-olefin is propylene.
6. A process according to claim 1 wherein said conjugated diolefinic hydrocarbon is butadiene.
7. A process according to claim 1 wherein said conjugated diolefinic hydrocarbon is isoprene.
8. A process according to claim 1 wherein said cobalt compound is made to exist in an amount of $10^{-5}$ to $10^{-1}$ mol per 1 mol of the conjugated diolefinic hydrocarbons.
9. A process for producing hexadienes which comprises reacting an alpha-olefin of the formula R—CH=CH₂ wherein R is selected from the group consisting of hydrogen and alkyls of 1 to 8 carbon atoms with a conjugated diolefinic hydrocarbon in the presence of a catalytic amount of a composition consisting of two components of:
 (1) a cobalt compound of the formula $$CoH[R_2P(R')_nPR_2]_m$$

wherein R is a member selected from alkyl and aryl groups, R' is a member selected from alkylene, alkenylene and arylene groups, n is 0 or 1, and m is 1 or 2; and
 (2) an organoaluminum compound of the formula $$R^2_lAlX_{3-l}$$

wherein R² is a monovalent hydrocarbon group, X is a member selected from hydrogen and halogen groups, and l is a number from 1 to 3;
characterized in that the molar ratio of said compound (2) to said compound (1) being at least one.
10. A process as described in claim 9 wherein said cobalt-compound is CoH[(C₆H₅)₂PCH₂CH₂P(C₆H₅)₂]₂.
11. A process as described in claim 9 wherein said alpha-olefin is ethylene and said conjugated diolefinic hydrocarbon is butadiene.
12. A process for producing hexadienes which comprises reacting an alpha-olefin of the formula R—CH=CH₂ wherein R is selected from the group consisting of hydrogen and alkyls of 1 to 8 carbon atoms with a conjugated diolefinic hydrocarbon in the presence of a catalytic amount of a composition consisting of two components of:
 (1) a cobalt compound of the formula $$CoH[R_2P(R')_nPR_2]_m$$

wherein R is a member selected from alkyl and aryl groups, R' is a member selected from alkylene, alkenylene and arylene groups, n is 0 or 1, and m is 1 or 2; and
 (2) an organic compound of the formula $$R^3OH$$

wherein R³ is a member selected from alkyl, cycloalkyl, aryl and substituted aryl groups, characterized in that said components (2) and (1) are contained in said composition such that the molar ratio thereof is within the range of 10–200:1.
13. A process as described in claim 12 wherein said cobalt compound is CoH[(C₆H₅)₂PCH₂CH₂P(C₆H₅)₂]₂.
14. A process as described in claim 12 wherein said alphaolefin is ethylene and said conjugated diolefinic hydrocarbon is butadiene.
15. A process as described in claim 12 wherein said compound of the formula $R^3OH$ is halogen-substituted phenols.

16. A process as described in claim 12 wherein hydrogen is added to the reaction system at the time of carrying out a reaction.

17. A process for producing hexadienes which comprises reacting an alpha-monoolefin with a conjugated diolefinic hydrocarbon in the presence of a catalyst prepared by mixing bis[ethylene-bis(diphenylphosphine)] cobalt (I) hydride and an alkylaluminum halide.

No references cited.

PAUL M. COUGHLAN, JR., Primary Examiner

U.S. Cl. X.R.

252—429, 431